United States Patent Office 3,448,648
Patented June 10, 1969

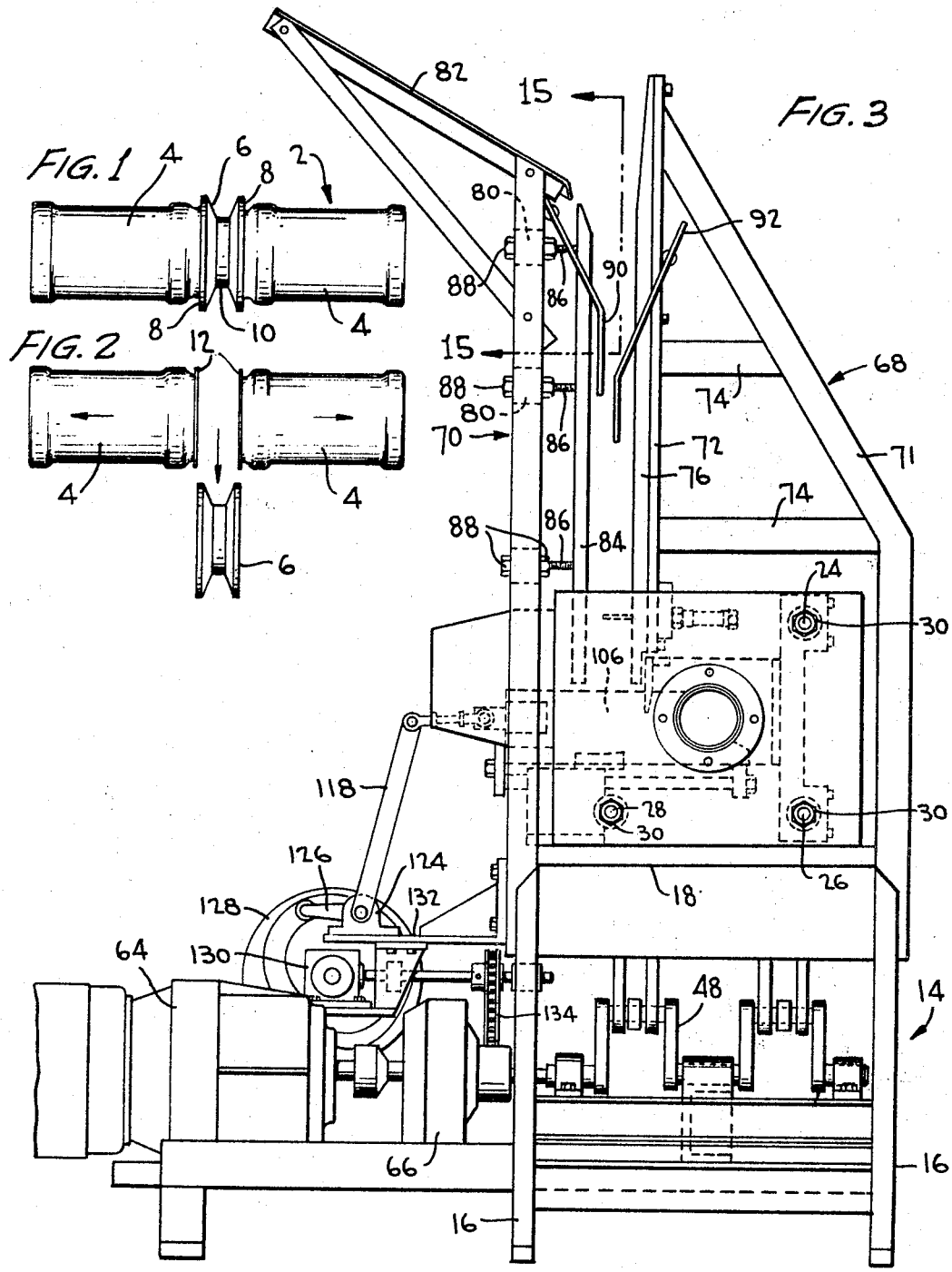

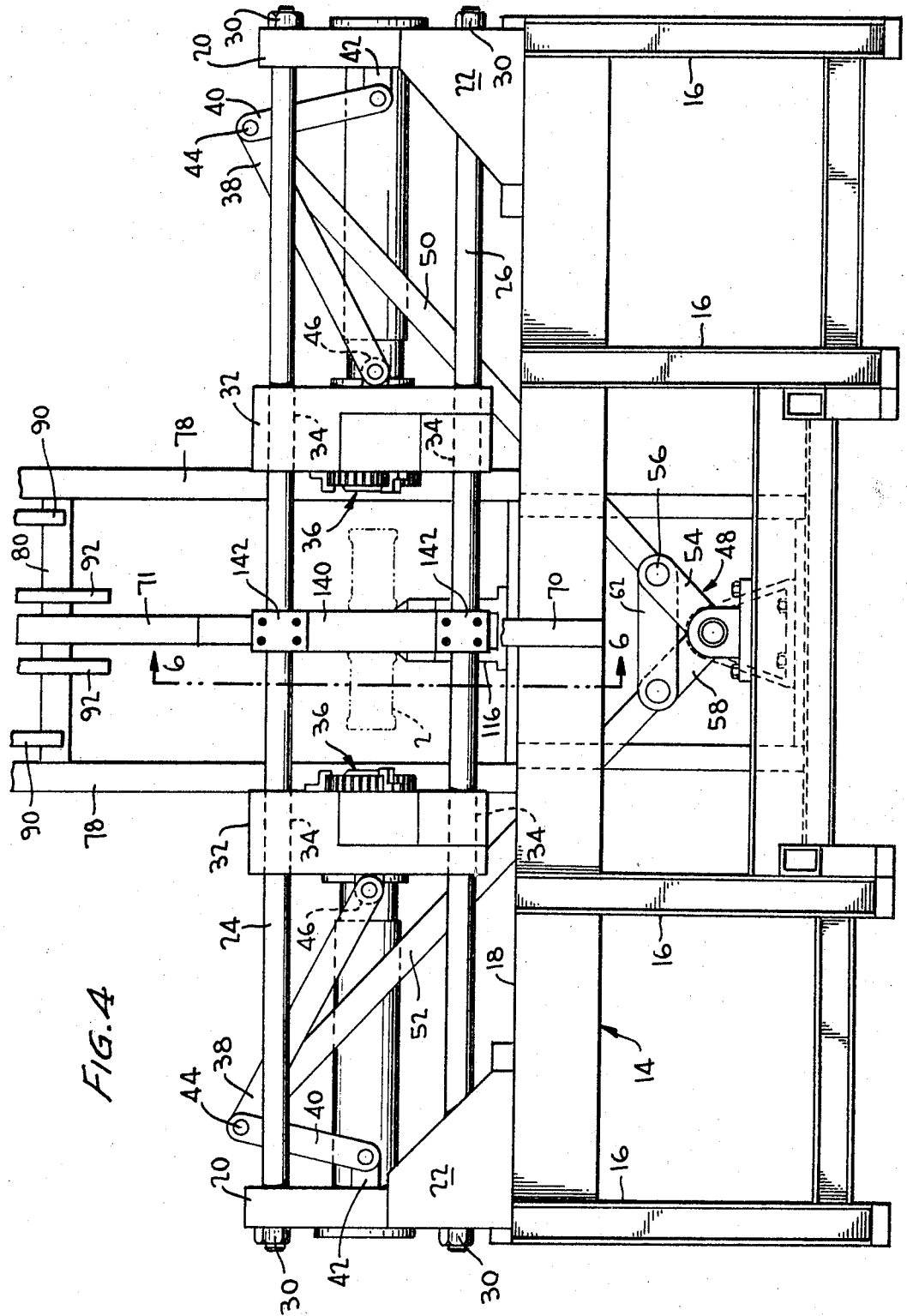

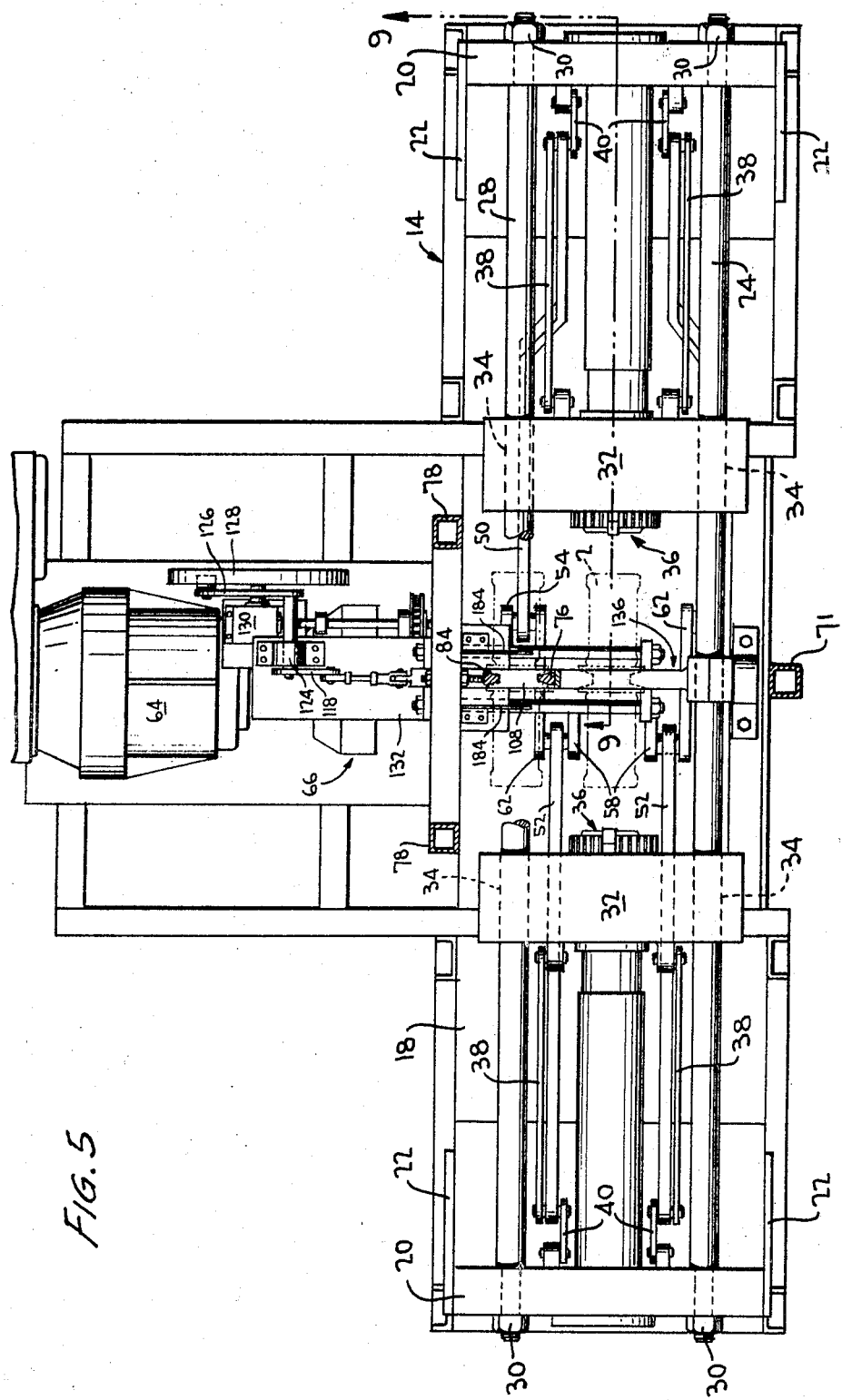

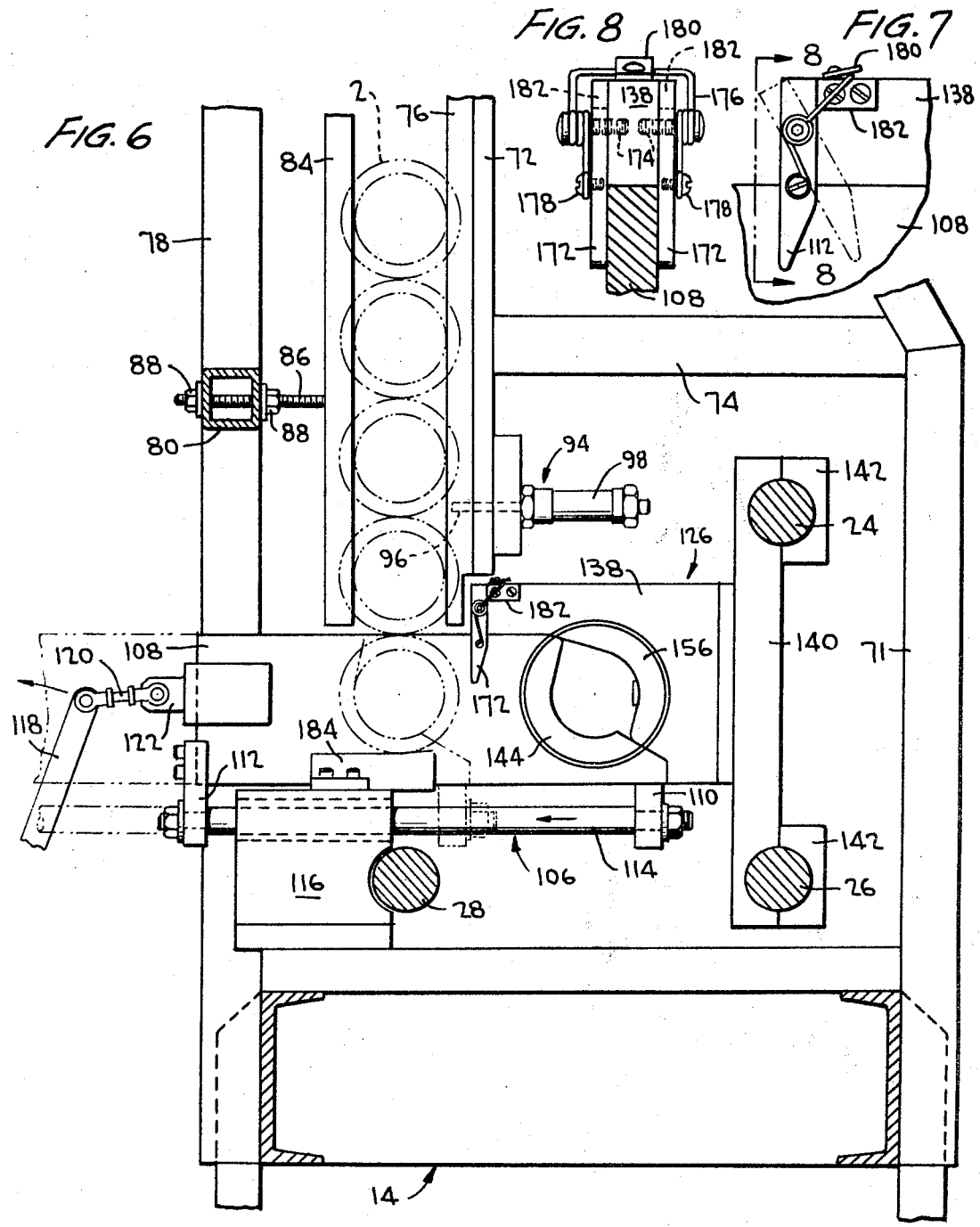

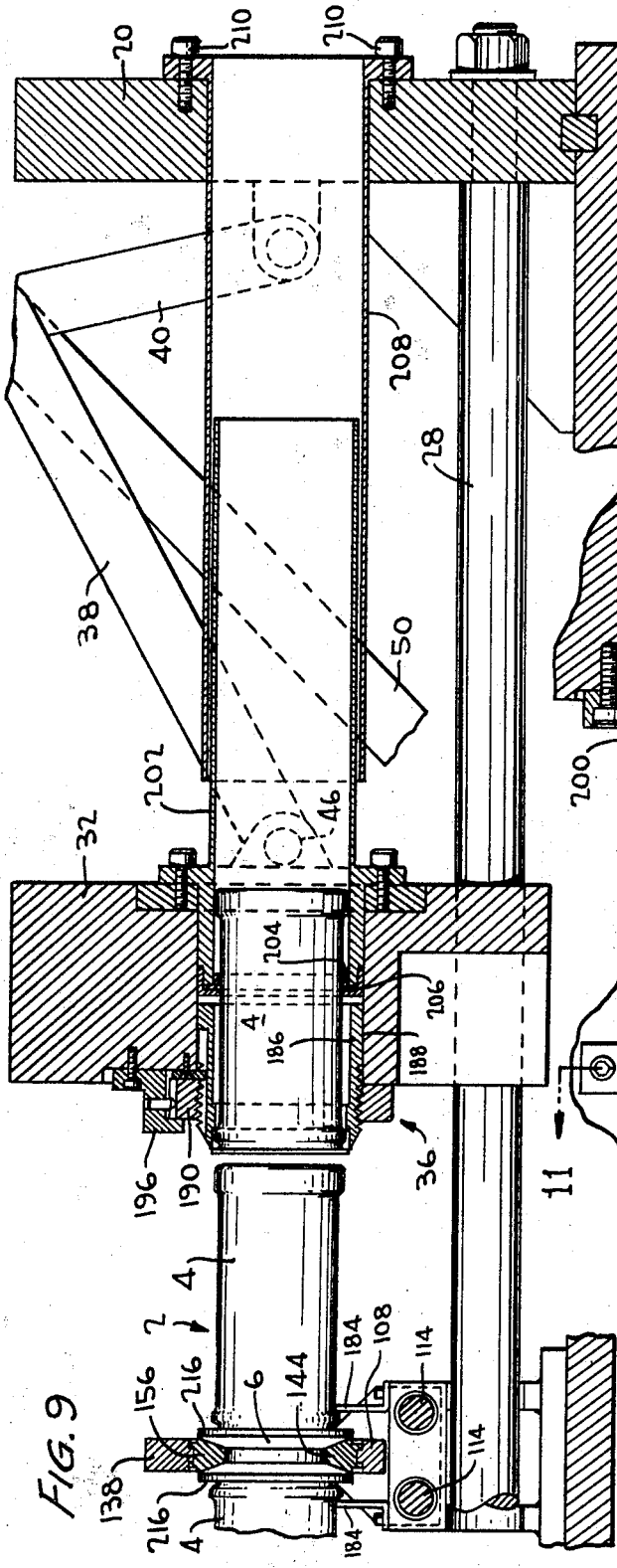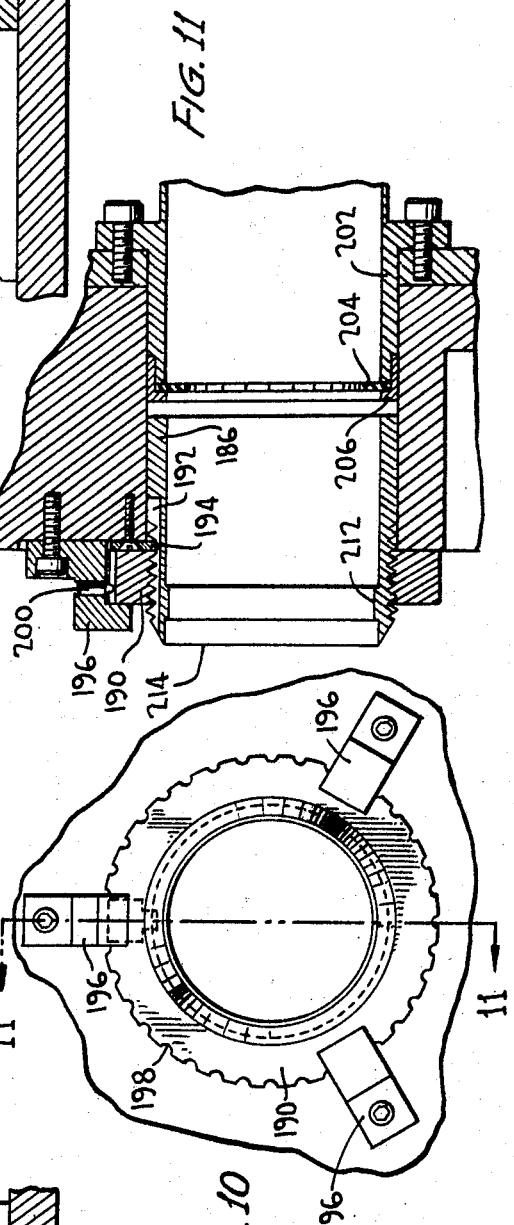

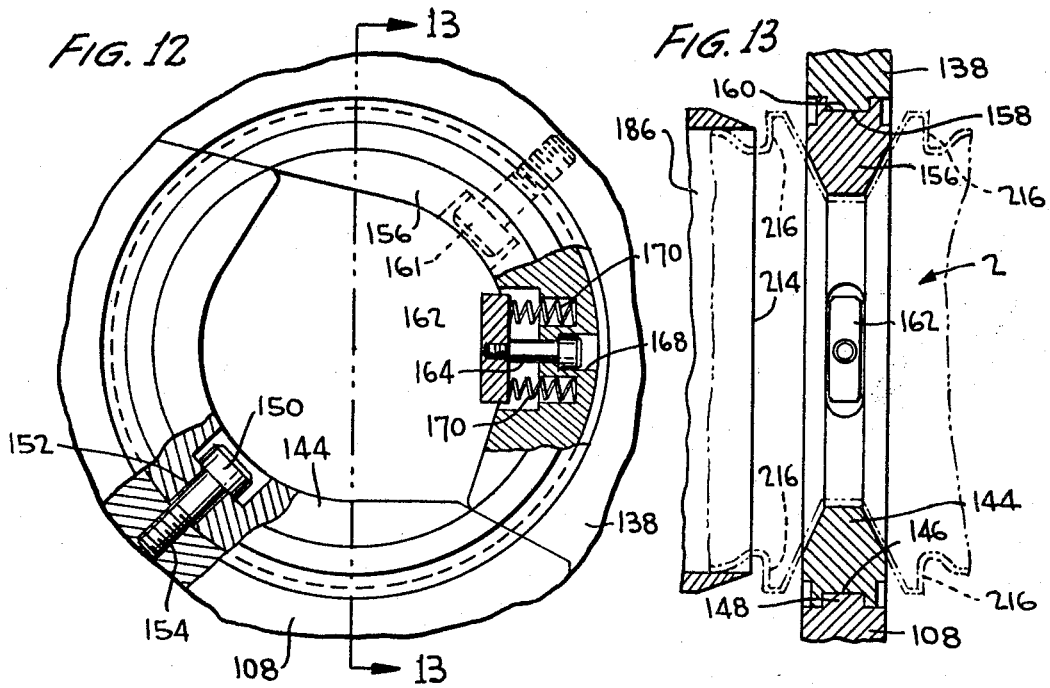
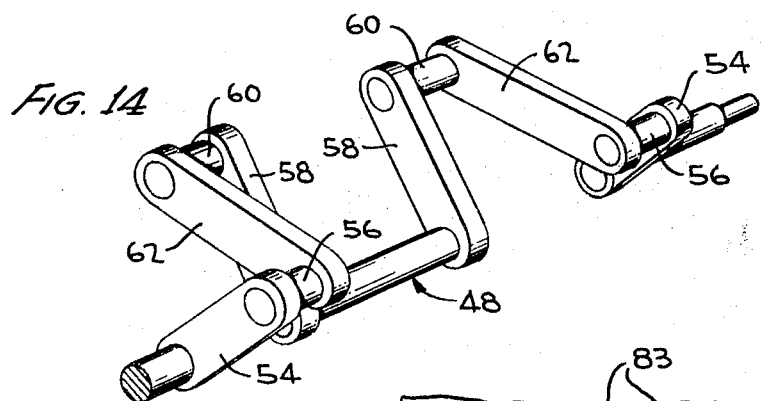
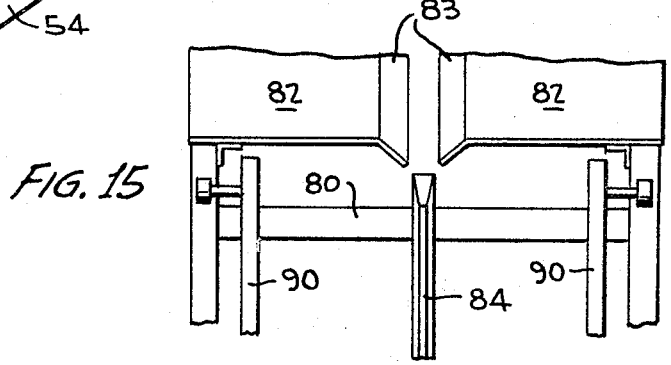

3,448,648
APPARATUS FOR FEEDING AND TRIMMING TANDEM BLOWN CONTAINERS
William R. Magruder, Wilmington, Marty E. Sixt, Newark, and Roger H. Steiner, Claymont, Del., assignors, by mesne assignments, to American Can Company, New York, N.Y., a corporation of New Jersey
Filed July 29, 1966, Ser. No. 568,506
Int. Cl. B26d 5/22, 5/12
U.S. Cl. 83—566                                    19 Claims

ABSTRACT OF THE DISCLOSURE

Apparatus for trimming hollow articles includes means for clamping the articles in a predetermined orientation and a cylindrical knife assembly which passes over the clamped articles to sever a flange or the like on the articles. By way of example, the apparatus is operable to trim the neck which interconnects tandem blow-molded plastic containers.

This invention relates to apparatus for forming hollow plastic containers, and more particularly, to apparatus for trimming tandem, blow-molded plastic containers.

Generally, hollow plastic articles are formed by clamping the opposite ends of a tubular parison of thermoplastic material in a mold cavity and then injecting air into the parison to cause to expand outwardly against the walls of the mold cavity. The hollow article thus formed has a thin wall and conforms to the shape of the cavity. When the mold is opened, the molded article is trimmed to remove the flash or excess material where the ends of the parson were pinched together.

It is desirable to mold several articles simultaneously with each opening and closing cycle of the mold sections. One method of accomplishing this is to provide two mold cavities with a neck portion connecting the two cavities together. In using this arrangement, air may be injected into the tubular parison at the neck by means of a hypodermic needle which pierces the tubular parison. Air flows into the interior of the parison through the needle to expand the tube outwardly against the walls of both cavities simultaneously. When the mold is opened, the tandem blown articles that are joined together by the neck are removed, and the articles may be separated from each other by severing the neck. Since the article that is removed from the mold has some flash and a connecting neck, it may be referred to as a "blank" which has to be trimmed to form the finished article.

When the neck is separated from the articles, which are usually bottles or containers, the portion of the article adjacent the neck forms an opening through which the bottle or container is filled. A closure, such as a screw cap or crimped cover, may be applied over the opening after the bottle has been filled. Consequently, it is important that the neck be severed from the bottle or container at the proper location, so that the subsequent application of the closure is not impaired. Severing the neck inaccurately may result in extra material from the neck remaining at the mouth of the bottle, which would have to be removed. Also, if the neck is severed crookedly, and not in a plane at right angles to the central axis of the bottle, it may be impossible to apply the closure to the bottle.

Accordingly, it is an object of this invention to provide apparatus for trimming the neck interconnecting tandem blown containers.

It is a further object of this invention to provide apparatus for accurately severing the neck which interconnects tandem blown containers.

It is a still further object of this invention to provide apparatus for rapidly and efficiently trimming the neck from tandem blown containers and subsequently separating the severed neck from the finished containers.

These objects are accomplished in accordance with a preferred embodiment of the invention by apparatus which arranges the tandem blown blank in a predetermined orientation for trimming, and intermittently advances the blank into a holder that is in the form of a segmental ring which surrounds the neck portion of the blank. A pair of cylindrical knife assemblies pass over the opposite ends of the blank and sever a flange on the neck portion adjacent the holder. The knife assemblies, after severing the flange, hold the severed end portion, i.e. the container, in the interior of the cylindrical knife. The severed container is pushed out through the opposite end of the cylindrical knife by containers which are severed during succeeding cycles. The neck portion that is severed from the blank remains in the ring until the segments of the ring separate to release the neck portion, as the next blank is moving into the segmental ring. The operation of the apparatus is timed in such a way that the knife assemblies reciprocate substantially continuously and the bottles are fed into the ring of the holder at appropriate intervals for quickly and accurately severing the neck portion from the blank.

This preferred embodiment is illustrated in the accompanying drawings, in which:

FIG. 1 is a side elevational view of the blank that is trimmed in the apparatus of this invention to form a pair of large mouth cans;

FIG. 2 is a schematic view of the blank showing the removal of the neck portion;

FIG. 3 is a side elevational view of the blank feeding and trimming apparatus of this invention;

FIG. 4 is a front elevational view of the apparatus;

FIG. 5 is a top plan view of the apparatus;

FIG. 6 is a cross-sectional view of the apparatus along the line 6—6 in FIG. 4;

FIG. 7 is a detail view of the stripper bar assembly;

FIG. 8 is a cross-sectional view of the apparatus along the line 8—8 in FIG. 7;

FIG. 9 is a cross-sectional view of the apparatus along the line 9—9 in FIG. 5, showing the cylindrical knife assembly;

FIG. 10 is a front elevational view of the knife assembly;

FIG. 11 is a cross-sectional view of the knife assembly along the line 11—11 in FIG. 10;

FIG. 12 is a detail view of the shuttle and anvil in position for supporting a blank while it is trimmed;

FIG. 13 is a cross-sectional view of the shuttle and anvil along the line 13—13 in FIG. 12;

FIG. 14 is a perspective view of the crank for reciprocating the platens; and

FIG. 15 is a cross-sectional view of the rear rail support and loading tray along the line 15—15 in FIG. 3.

In order to illustrate the construction and operation of a preferred embodiment of the apparatus of this invention, a tandem blown can blank 2 is illustrated in FIG. 1. The blank 2 is typical of blow-molded hollow articles that may be trimmed by the apparatus of this invention. Generally, the blow molding process involves clamping the ends of a tubular parison between two mold sections. The mold sections have a pair of cavities that are spaced longitudinally apart in the shape of the cans 4. The mold cavity also includes a neck portion 6 which interconnects the portions of the cavity forming the cans 4. The parison is expanded radially by inserting a needle through the wall of the parison at the neck 6. Air or gas flows into the interior of the parison through the needle and the air pressure in the parison expands the tubular parison outwardly to conform to the shape of the cavity. Usually, the parison has been heated sufficiently to allow it to be readily expanded to fill the mold cavity. When the expanded parison has cooled sufficiently to retain its shape, the mold is opened and the blank 2 is removed from the mold. The neck 6 of the blank 2 has a hole where the hypodermic needle penetrated the parison, but this does not interfere with the final product, since the neck portion 6 is removed when the cans 4 are separated from each other in the trimming machine of this invention.

There are certain significant features of the tandem blown blank 2. The can portions 4 are preferably cylindrical. The neck portion 6 has a radial flange 8 adjacent each of the cans 4. The flanges 8 project outwardly a greater radial distance than the maximum diameter of the wall of the cans 4. Between the radial flanges 8, the neck has a circumferential groove, with the base 10 of the groove being sufficiently wide to permit the insertion of the hypodermic needle. The base 10 of the groove is the area of minimum expansion of the parison and thus a relatively short needle may be used. Also, there is less danger of the parison tearing around the needle hole during expansion when the degree of expansion at the needle hole is relatively small.

As shown in FIG. 2, the blank 2 is trimmed to separate the can portions 4 by cutting the radial flanges 8 along a circular path around the central axis of the blank. The path is located at a radius that is spaced from the inner and outer edges of the flange 8. The separated can portions 4 each have a radial lip 12 to which a suitable closure cap or cover may be secured. The tabs at the opposite ends of the blanks 2, which are formed by the closed ends of the parison, are removed by any suitable means prior to trimming.

Referring to FIGS. 3, 4 and 5, the trimming apparatus of this invention includes a frame which is generally in the form of a table 14 or stand with upright legs 16 and a generally horizontal support surface 18 formed by the frame members at the top of the table 14. The table 14 has end plates 20 rigidly mounted on the surface 18 at the opposite ends of the table. The end plates 20 are braced by web members 22. Tie bars 24, 26 and 28 extend between the end plates 20. The opposite ends of the tie bars are threaded to receive nuts 30 which bear against the outer surfaces of the restrictive end plates 20. Thus, the tie bars 24, 26 and 28 are rigidly mounted in substantially parallel relation on the table 14.

A pair of platens 32 are mounted for reciprocating movement along the tie bars 24, 26 and 28. Each of the platens 32 has suitable bores 34 through which the tie bars extend. The bores 34 have only a slightly larger internal diameter than the external diameter of the tie bars to minimize deviation of the platen from its desired path of movement.

The platens 32 each have a knife assembly 36 which severs the neck portion 6 from a blank 2 as the platens 32 move toward each other. The knife assemblies pass over the ends of the blank, which is held in a fixture at the center of the table 14. Reciprocating movement of each platen 32 is accomplished by a pair of toggle links 38 and 40. The link 40 for each platen is hinged at one end to a bracket 42 on the end plate 20, and the opposite end of the link 40 is connected by a pin 44 to one end of the cooperating toggle link 38. The opposite end of the link 38 is hingedly secured to a bracket 46 on the platen 32. Connecting rods 50 and 52 are journaled at one end on the link pin 44 and the opposite end is journaled on a crankshaft 48. As shown in FIGS. 4 and 5, the toggle links for both right-hand and left-hand platens are substantially the same and there are actually pairs of identical toggle links on opposite sides of each platen. There are two toggle links 38 and 40 controlling the motion of each platen 32. The connecting rod 50 for the right-hand platen, as shown in FIG. 4, is mounted in substantially the same arrangement as the corresponding connecting rod 52 for the left-hand platen, but the connecting rod 50 has an angular bend to align the lower end of the connecting rod with the appropriate crankpin of the crankshaft 48.

The crankshaft 48 is shown in a perspective view in FIG. 14 and has a pair of crank arms 54 which support crankpins 56. The connecting rods 52 are attached to the crankpins 56. The crank arms 54 are arranged at approximately 90° of rotation from another pair of crank arms 58 which support the crankpins 60 on which the lower ends of the connecting rods 52 are mounted. The crankpins 56 and 60 are connected together and supported by bars 62. The crankshaft 48 is driven by an electric motor 64 through a speed reducer and clutch 66. The toggle linkage and the crankshaft 48 cause both platens 32 to advance toward each other as the crankshaft is rotated in one direction by the motor 64. After performing the cutting operation, the platens 32 move away from each other to the retracted position which is shown in FIG. 4.

The can blanks 2 are oriented and conveyed into position for trimming by the knife assemblies 36 in timed relation with the reciprocating motion of the platens 32. Referring to FIGS. 3, 4, 5 and 6, the blank feeding apparatus includes a front rail support 68 and a rear rail support 70. The front rail support 68 includes an upright brace 71 which is welded or otherwise secured to the front of the table 14. A mounting plate 72 is secured on the brace 71 at its upper end and supported in a substantially vertical position by a pair of horizontal members 74. A front rail 76 is secured to the plate 72 by screws or other suitable means.

The rear rail support 70 includes a pair of upright braces 78 which are secured at their lower ends by welding or other suitable means to the rear of table 14. A plurality of cross braces 80 secure the upright braces together. A loading tray 82 is mounted at the top of the braces 78 for receiving can blanks 2. The tray 82, as shown in FIG. 15, has a central groove 83 for aligning the neck portion 6 of the blanks 2 with the rail 76. A rear rail 84 is secured in a vertical position on the cross braces 80 by a plurality of studs 86. The studs extend through the cross braces 80 and a pair of nuts 88 on opposite sides of the cross braces 80 permit adjustment of the distance separating the rear rail 84 from the front rail 76 (FIG. 3).

The rails 76 and 84 are arranged approximately midway of the length of the table 14 and the blanks that are deposited on the tray 82 roll downwardly to the lower end of the tray until the neck portion 6 of the can blank 2 passes into the gap between the rails 76 and 84. The groove 83 in the tray aligns neck portion 6 of the blanks 2 with the rails as the blanks roll down the tray 82. Spring-loaded tail guides 90 and 92 are mounted on the rear and front rail supports, respectively, and as shown in FIG. 4, the tail guides are positioned longitudinally of the blanks 2, so that the stack of blanks between the rails 76 and 84 will be aligned substantially perpendicular to the plane of both rails 76 and 84.

At the lower end of the plate 72 there is a stop mechanism 94 which includes a plunger rod 96 extending through the plate 72 and the rail 76 into the path of the can blanks 2. A fluid actuator 98, which may be in the form of a double-acting air cylinder, controls the longitudinal position of the plunger rod 96. The plunger rod 96 is normally retracted by the cylinder 98, so that the downward movement of the can blanks 2 is unrestricted. When the supply of blanks 2 is nearly exhausted, plunger 96 is extended to prevent the can blanks from being fed into the machine.

Directly below the lower ends of the rails 76 and 84, a shuttle assembly 106 is mounted for reciprocating movement on the table 14. The shuttle assembly includes a vertical shuttle plate 108 (FIGS. 5 and 9). A front bracket 110 is secured to one end of the plate 108 and a rear bracket 112 is secured to the other end of the plate 108. A pair of rods 114 are rigidly mounted in the brackets 110 and 112. The rods 114 extend through bushings in a stationary bearing block 116 that is secured to the table 14, and the rods 114 support the shuttle assembly for longitudinal reciprocation relative to the block 16.

Motion is imparted to the shuttle assembly 106 by a lever 118 that is driven by the motor 64. One end of the lever 118 is connected with the shuttle plate 108 by a pivot link 120 which is attached to a bracket 122 on the rear of the plate 108. As shown in FIGS. 3 and 5, the lever 118 is rigidly connected at its lower end with the shaft of a bearing block 124. The opposite end of the bearing block shaft is rigidly connected to a cam follower 126. Angular movement of the cam follower 126 causes the lever 118 to swing through an arc corresponding to the angular displacement of the follower 126. The follower cooperates with a disc cam 128 which is mounted for rotation on the output shaft of a speed reducer 130. The speed reducer and the bearing block 124 are supported on a cantilever frame 132. The speed reducer 130 is driven from the coupling shaft 66 by a sprocket chain 134, or other suitable means. The cam 128 is designed to provide intermittent reciprocating motion of the shuttle plate 108 in timed relation to the rotation of the crankshaft 48.

An anvil assembly 136 (FIGS. 5 and 6) cooperates with the shuttle assembly 106 for supporting a can blank 2 during trimming by the knife assemblies 36. The anvil assembly includes a vertical plate 138 that is secured on and extends rearwardly from a mounting plate 140. The mounting plate 140 is rigidly secured on the front tie bars 24 and 26 by caps 142.

The shuttle plate 108 and anvil plate 138 cooperate to form a holder for temporarily supporting a can blank 2 in alignment with the circular knife assemblies. The shuttle plate 108 has an arcuate collar 144 forming a support surface which has substantially the same shape and size as the neck portion 6 of the can blank 2, as shown in FIG. 9. The collar 144 is rigidly secured against lateral displacement by a central groove 146 which cooperates with a corresponding radial flange 148 on the shuttle plate 108. The collar 144 is secured to the plate 108 by a cap screw 150 which extends through a countersunk hole 152 in the collar 144 and into a threaded hole 154 in the plate 108.

A similar arcuate collar 156 is mounted in the anvil plate 138. The collar 156 is secured in the plate 138 in substantially the same manner as the collar 144, including a groove 158 which cooperates with a radial flange 160 on the support plate 138 and a cap screw 161. A neck ejector in the form of a bar 162 is mounted in the collar 156. The bar 162 is secured to the end of a cap screw 164 which extends through a countersunk bore 168 in the collar. The screw 164 fits loosely in the bore 168 to permit axial movement of the screw relative to the collar 156. The bar 162 is biased outwardly by a pair of coil springs 170 and when the neck portion 6 of a can blank is clamped between the collars 144 and 156, the bar 162 is depressed radially outward, but when the shuttle plate 108 moves away from the anvil plate 138, the springs 170 displace the bar 162 radially inward, thereby ejecting the severed neck portion from the collar 156.

The anvil plate 138 also has a pair of swinging latch bars 172, shown in FIGS. 6, 7 and 8. The elongated box 172 are mounted for swinging movement on screws 174. A wire spring 176 has its opposite ends looped around the screws 174 and fastened to the respective bars 172 by a screw 178. The intermediate portion of the spring 176 is fastened to the anvil plate 138 by a fixed tab 180. There are a pair of blocks 182 secured on opposite sides of the plate 138 by means of screws. Each bar 172 abuts against the end of the block 182 when the bars are in the position shown in full lines in FIG. 7. The blocks 182 thus restrict swinging movement of the bars in a clockwise direction, but do not restrict the counterclockwise swinging of the bars as viewed in FIG. 7.

Secured to the bearing block 116 on opposite sides of the shuttle plate 108 are stationary guides 184 (FIGS. 6 and 9). The guides support a can blank 2 horizontally when it drops from between the rails 76 and 84 and into the collar 144. The stack of blanks 2 are supported by the upper edge of the suttle plate 108 until the plate is fully retracted to the position shown in phantom lines in FIG. 6. The lowermost blank 2 in the stack drops into the collar 144 when the shuttle is fully retracted. Since the blank is no longer supported by the rails, the guides 184 cooperate with the collar 144 to maintain the blank 2 horizontal.

The knife assembly 36 that is mounted in each platen 32 includes a cylindrical knife 186, as shown in FIGS. 9, 10 and 11. The knife assembly of the left-hand platen 32 is not shown in FIGS. 9, 10 and 11, but it has the same structure at the right-hand platen. The knife 186 is inserted in a bore 188 in the platen 32. The platen bore 188 is substantially aligned with the center of the opening formed by the arcuate collars 144 and 156 in the shuttle assembly and anvil plate, respectively.

The knife 186 is adjustable longitudinally in the bore 188 by means of an adjusting nut 190 which threadedly engages external threads on the knife and bears against the face of the platen. A longitudinal keyway 192 in the outer surface of the knife 186 cooperates with a key 194 on the platen to resist rotation of the knife when the nut 190 is turned to advance or retract the knife longitudinally. The nut 190 bears against the face of the platen 32 and is restricted from displacement away from the platen by brackets 196 on the platen. The brackets 196 overlap the outer face of the nut 190. The peripheral edge of the nut 190 has a plurality of longitudinal grooves 198 which cooperate with a spring-loaded stop 200. The stop resists rotation of the nut 190, but may be overcome by applying a slight torque. The stop prevents unintentional rotation of the nut, and the spacing of the grooves is calibrated to indicate the longitudinal displacement of the knife 186.

A tube 202 is also mounted in the bore 188. The tube 202 is rigidly secured to the platen and is substantially aligned with the central axis of knife 186. Adjacent the inner end of the knife, a resilient disc 204 is mounted on the end of the tube 202 and held in place by a clamp ring 206. A tubular extension 208 is arranged in telescoping relation over the tube 202 and the opposite end of the extension is secured in the end plate 20 by screws 210. The tube 202 and the extension 208 slide relative to each other during movement of the platen 32, while providing a continuous passage from adjacent the knife 186 to the outer face of the end plate 20.

The knife 186 has an internal circumferential land 212 which has approximately the same diameter as the cylindrical central portion of the can 4 that is to be severed from the blank. The disc 204 has a central opening which is smaller than the blank 2 and as the platen 32 moves toward the stationary anvil plate 138, the end of the blank deflects the ring 204 to enlarge the opening sufficiently to allow the end of the blank to pass through the opening. The ring 204 preferably has a plurality of radial slits to facilitate deflection of the ring. Thus, the inner edge of the ring 204 grips the body of the blank before and after severing the can portion from the blank.

The knife 186 has a cutting edge 214 which is positioned to sever the can from the blank at the radial face 216 which connects the maximum diameter of the neck with the can portion 6 (FIGS. 9 and 13). By turning the nut 190 the position of the knife edge 214 with respect to the collars 144 and 156 may be adjusted. Preferably, the knife edge 214 just pierces the radial wall 216 when the platen is at its maximum extent of travel toward the anvil plate 138. The knife edge 214 does not engage the collars 144 and 156, but merely approaches close enough to sever the radial wall 216 to separate the can portion 4 from the neck portion 6.

After the can portion 4 has been severed by the knife 186, each platen 32 begins to move away from the anvil plate 138. The right-hand platen 32 moves toward the right as viewed in FIG. 9, and the resilient disc 204 grips the side wall of the can portion 4, thus drawing the can along with the platen 32. Previously severed can portions remain in the tube 202 and the extension 208 until displaced by the next succeeding severed can portion. Ultimately, the can portion passes through the open end of the extension 208 at the outer face of the end wall 20.

In operation, a plurality of can blanks 2 are deposited on the tray 82 (FIGS. 3 and 15) with the neck portion 6 of each blank 2 being received in the groove 83. One by one, the can blanks 2 fall from the tray into the space between the rails 76 and 84, with the rails projecting into the circumferential groove in the neck portion 6 of each blank. The tail guides 90 and 92 turn the blanks 2, if necessary, until the longitudinal axis of each blank lies in a plane which is substantially at right angles to the plane passing through the longitudinal axes of both of the rails 76 and 84. The plunger 96 (FIG. 6) is extended temporarily to support blanks 2 in the rails prior to starting the trimming.

When the motor 64 is operating, it drives the clutch 66 which turns the crankshaft 48 at a uniform speed and drives the speed reducer 130. The speed reducer 130 rotates the cam wheel 128 at a uniform speed and the cam follower 126 swings the lever 118 at appropriate intervals to cause the shuttle plate 108 to reciprocate in timed relation to the motion of the platens 32 which are operated by the crankshaft 48. The plunger 96 is then retracted to allow the stack of blanks to be supported by the upper edge of the shuttle plate 108. The shuttle 106 is initially in its retracted position, that is, the phantom line position shown in FIG. 6. The can blank stack drops when the shuttle is retracted and the lowermost blank 2 passes from between the rails 76 and 84 into the collar 144 on the shuttle plate 108. When blank 2 is deposited in the collar 144, the stationary guides 184 on opposite sides of the plate 108 support the blank 2 substantially horizontally. The plate 108 then begins to move toward the right as the cam 128 swings the lever 118 clockwise, as viewed in FIG. 6.

The blank 2 is carried forward by the shuttle plate 108. As the blank moves past the latch bars 172, the blank swings the bars 172 to the position shown in the dotted lines in FIG. 7. The bars 172 swing readily and therefore offer very little resistance to the movement of the blank. The shuttle stops its forward movement when the blank is tightly clamped between the shuttle collar 144 and the anvil collar 156. The stack of blanks between the rails is supported by the top edge of the shuttle plate 108 while the collar 144 is displaced forwardly of the rails.

The motion of the platens 32 is coordinated with the movement of the shuttle in such a way that the knife 186 passes over the end of the blank 2 as the blank comes to rest against the anvil collar 156. The platens 32 continue to move toward each other and at the innermost limit of travel the edge 214 of each knife severs the adjacent radial wall 216. The knives on opposite sides of the collars 144 and 156 sever both radial walls 216 simultaneously at approximately the position shown in FIG. 13. Immediately after severing the cans 4 from the neck portion 6, the crankshaft 48 moves the connecting rods 50 and 52 upwardly to fold the toggle links 38 and 40 upwardly, as shown in FIG. 9. This causes the platens 32 to move back to the retracted position. The severed can portions 4 are carried in each knife 186 and are gripped by the disc 204 in each of the tubes 202.

As the platens 32 move apart, the shuttle assembly 106 moves rearwardly to receive the next can blank 2. Meanwhile, severed neck portion 6 is dislodged from the anvil collar 156 by the spring-loaded bar 162. If the neck portion 6 should stick in the shuttle collar 144, the hinged bars 172 would engage and eject the neck portion 6 from the collar 144 as the plate 108 retracts rearwardly. The neck portion drops directly downwardly to a refuse bin or other disposal means below the anvil plate 138 and the shuttle assembly 106 is ready to receive the next can blank 2.

When the next blank is clamped against the anvil plate 138, the platens 32 again move toward the anvil plate 138, and in each platen 32 the closed end of the blank 2 engages the lip portion of the previously severed can 4. As the platen 32 continues its travel, the blank 2 displaces the can progressively along the tube 202 toward the outlet at the end plate 20. Depending upon the length of the tube 202 and the extension 208, several cans may be contained in the tube, but during each cycle they are progressively displaced toward the outlet in the end plate 20, where they are released into a bin or conveyor.

The apparatus of this invention is capable of operating at relatively high speed to trim can blanks 2. By a single cutting operation wide mouth containers are produced which have a lip around the opening that is of a uniform radius from the central axis of the container, and lies in a plane that is perpendicular to the axis of the blank. Furthermore, the apparatus of this invention separates the containers from the scrap. The neck portions, which are waste or scrap, are collected at the center of the machine, while the severed containers are delivered to the opposite ends of the machine.

Although this invention has been illustrated and described in one embodiment, it is recognized that variations and changes may be made without departing from the invention as set forth in the claims.

What is claimed is:

1. Apparatus for trimming a hollow article comprising a frame, a fixture mounted on said frame, said fixture including means for temporarily supporting an article, a platen mounted on said frame at one side of said fixture, means for displacing said platen along a path toward and away from said fixture, trimming means on said platen, said trimming means including a tube extending along said platen path, said tube having an end adjacent said fixture, and a circular knife on said tube, whereby a hollow article that is clamped in said fixture is trimmed by said knife as said platen is displaced toward said fixture.

2. Apparatus according to claim 1 including a second platen on said frame at another side of said fixture, means for displacing said second platen along a path toward and away from said fixture, and trimming means on said second platen.

3. Apparatus according to claim 2 wherein each of said platens are displaced simultaneously toward said fixture for trimming the article on different sides of said fixture at the same time.

4. Apparatus according to claim 3 wherein said frame includes a plurality of straight tie bars extending across said frame, said platens being mounted for reciprocating movement on said tie bars.

5. Apparatus according to claim 3 wherein each of said platens is connected to said frame by a pair of toggle links and means for swinging said toggle links for simultaneously displacing said platens toward and away from said fixture.

6. Apparatus according to claim 1 wherein said fixture securely grips said article between a pair of arcuate segments, said segments defining an article receiving opening substantially aligned with said path.

7. Apparatus according to claim 1 wherein said tube is mounted on said platen in substantial alignment with the central axis of said article supporting means, said circular knife being in the form of an annular ring with a cutting edge on one end of said ring, and said ring being mounted coaxially with said tube and said central axis.

8. Apparatus according to claim 7 including a resilient ring, means for securing said ring in said platen between said knife and said tube, said resilient ring being aligned with said tube, whereby the resilient ring grips article portions trimmed by the knife.

9. Apparatus according to claim 7 wherein said trimming means includes a collar, screw thread means between said ring and said collar, means restricting longitudinal movement of said collar relative to said platen, whereby turning said collar adjusts the spacing between said article supporting means and said cutting edge.

10. Apparatus according to claim 1 including a tubular extension, means mounting said extension on said frame in telescoping relation with said tube, whereby trimmed portions of said article are conveyed through said tube and said extension.

11. Apparatus according to claim 1 including means for intermittently feeding an article into said article supporting means in timed relation with the motion of said platen.

12. In a machine for trimming elongated hollow articles, a fixture for temporarily supporting said articles while being trimmed and apparatus for feeding articles to said fixture, comprising a frame, an anvil plate on said frame, a shuttle plate, a pair of opposed rails mounted on said frame above said shuttle plate, means for displacing said shuttle plate between a first position adjacent said anvil plate and a second position spaced from said anvil plate, said anvil plate and said shuttle plate having opposed edges, portions of said opposed edges defining an article supporting opening therebetween, said rails being aligned with said shuttle plate and being between said first and second shuttle plate positions, whereby articles are transferred from between said rails into the path of said shuttle plate and thereby conveyed into said article supporting opening between said shuttle plate edge and said anvil plate edge and temporarily clamped between said shuttle plate edge and said anvil plate edge while being trimmed.

13. The machine according to claim 12 wherein said shuttle plate and said anvil plate edges extend obliquely in a vertical plane to the path of said shuttle plate, whereby articles transferred downwardly from the rails are caught on said shuttle edge.

14. The machine according to claim 12 including guides on opposite sides of said shuttle plate for temporarily supporting articles in said shuttle.

15. The machine according to claim 12 including means for ejecting scrap material from said anvil plate and said shuttle plate after trimming.

16. Apparatus for separating an intermediate portion from the opposite end portions of an elongated hollow article comprising a frame, an article supporting fixture, said fixture including an anvil plate and a shuttle plate, means rigidly mounting said anvil plate on said frame, means for reciprocating said shuttle plate relative to said frame toward and away from said anvil plate, said plates having opposed edges, said edges including socket portions cooperating to define an article supporting opening therebetween, means for intermittently depositing articles in said shuttle socket portion while said shuttle is spaced from said anvil plate, a platen on each opposite side of said anvil plate, means for reciprocating said platens toward and away from said anvil plate, each platen having a tube mounted therein in alignment with the center of said opening between said opposed socket portions, a knife assembly on each platen between the tube and said anvil plate and aligned with said tube, each of said knife assemblies being spaced from said anvil plate throughout reciprocating motion of said platens, whereby an article deposited between said shuttle plate and said anvil plate by said depositing means is transferred by said shuttle plate and clamped between said socket portions while said platen tubes pass over the ends of said article and sever said intermediate portion adjacent said socket portion and said severed intermediate portion being removed upon reciprocating movement of said shuttle plate and said end portion being removed through said tubes.

17. Apparatus according to claim 16 wherein said socket portions are substantially arcuate, and have a peripheral surface extending parallel to the longitudinal axis of said arcuate socket portions, and have sides sloping outwardly from said peripheral surface, whereby the socket portions support the articles in alignment with the central axis of said tubes.

18. Apparatus according to claim 16 wherein said depositing means includes a pair of upright rails on said frame, said rails being in alignment with said shuttle plate, said rails terminating adjacent the upper surface of said shuttle plate, said shuttle plate being movable away from said anvil plate a distance greater than the distance between said rails, whereby an article is deposited in said shuttle socket portion from said rails and transferred by said shuttle plate into engagement with said anvil plate while the upper surface of said shuttle plate supports a stack of articles between said rails.

19. Apparatus according to claim 16 wherein said shuttle plate and said platens reciprocating means are coordinated to move said platens toward said anvil plate, while said shuttle plate is in engagement with said support plate, whereby an article is rigidly supported while being trimmed.

References Cited

UNITED STATES PATENTS

| 3,230,602 | 1/1966 | Bozek | 83—51 X |
| 3,319,498 | 5/1967 | Wolford | 83—91.4 X |

FOREIGN PATENTS

| 1,376,498 | 9/1964 | France. |
| 1,432,663 | 2/1966 | France. |

WILLIAM S. LAWSON, *Primary Examiner.*

U.S. Cl. X.R.

83—51, 580, 618, 623, 914